US012665226B2

(12) United States Patent
Jegal et al.

(10) Patent No.: US 12,665,226 B2
(45) Date of Patent: Jun. 23, 2026

(54) SECONDARY BATTERY AND MANUFACTURING METHOD OF THE SAME

(71) Applicant: LG ENERGY SOLUTION, LTD., Seoul (KR)

(72) Inventors: Jongpil Jegal, Daejeon (KR); Hyo Seok Kang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 716 days.

(21) Appl. No.: 17/779,437

(22) PCT Filed: Jan. 11, 2021

(86) PCT No.: PCT/KR2021/000300
§ 371 (c)(1),
(2) Date: May 24, 2022

(87) PCT Pub. No.: WO2021/153922
PCT Pub. Date: Aug. 5, 2021

(65) Prior Publication Data
US 2023/0006264 A1     Jan. 5, 2023

(30) Foreign Application Priority Data
Jan. 30, 2020     (KR) ........................ 10-2020-0011328

(51) Int. Cl.
*H01M 10/0587*     (2010.01)
*H01M 10/04*     (2006.01)
(Continued)

(52) U.S. Cl.
CPC ... *H01M 10/0587* (2013.01); *H01M 10/0431* (2013.01); *H01M 50/171* (2021.01); *H01M 50/188* (2021.01)

(58) Field of Classification Search
None
See application file for complete search history.

(56) References Cited

U.S. PATENT DOCUMENTS

2007/0224494 A1     9/2007  Kim
2009/0104510 A1     4/2009  Fulop et al.
(Continued)

FOREIGN PATENT DOCUMENTS

CN          215184180 U     12/2021
JP          8-162163 A      6/1996
(Continued)

OTHER PUBLICATIONS

DuPont Kapton Data Sheet (Year: 2016).*
(Continued)

*Primary Examiner* — Jeffrey T Barton
*Assistant Examiner* — Anna E. Goould
(74) *Attorney, Agent, or Firm* — Birch, Stewart, Kolasch & Birch, LLP

(57)          ABSTRACT
A secondary battery includes a jelly roll-type electrode assembly impregnated with an electrolyte solution; a battery case for housing the electrode assembly and the electrolyte solution; a cap assembly coupled with an upper portion of the battery case; and a reference electrode in which one end is immersed with the electrolyte solution and the other end is exposed to the outside through the battery case and the cap assembly.

11 Claims, 10 Drawing Sheets

(51) Int. Cl.
  H01M 50/171  (2021.01)
  H01M 50/188  (2021.01)

(56) References Cited

U.S. PATENT DOCUMENTS

| | | | |
|---|---|---|---|
| 2012/0263986 A1 | 10/2012 | Fulop et al. | |
| 2013/0009604 A1 | 1/2013 | Bhardwaj et al. | |
| 2014/0023888 A1 | 1/2014 | Fulop et al. | |
| 2014/0312911 A1 | 10/2014 | Ding | |
| 2015/0295284 A1 | 10/2015 | Kohlberger | |
| 2018/0151922 A1* | 5/2018 | Ito | H01M 50/176 |
| 2018/0159100 A1 | 6/2018 | Lee et al. | |
| 2018/0292461 A1 | 10/2018 | Kim et al. | |
| 2019/0064275 A1* | 2/2019 | Han | H01M 50/569 |
| 2023/0006264 A1 | 1/2023 | Jegal et al. | |

FOREIGN PATENT DOCUMENTS

| | | | | |
|---|---|---|---|---|
| JP | 2006-31979 A | | 2/2006 | |
| JP | 2010218900 A | * | 9/2010 | |
| JP | 2015220044 A | * | 12/2015 | Y02P 70/50 |
| JP | 2017-59348 A | | 3/2017 | |
| JP | 2002-50407 A | | 4/2026 | |
| KR | 10-2007-0096650 A | | 10/2007 | |
| KR | 10-2010-0075913 A | | 7/2010 | |
| KR | 10-2013-0128030 A | | 11/2013 | |
| KR | 10-2015-0005085 A | | 1/2015 | |
| KR | 10-2016-0143589 A | | 12/2016 | |
| KR | 10-2017-0021630 A | | 2/2017 | |
| KR | 10-2018-0127721 A | | 11/2018 | |
| KR | 10-1923091 B1 | | 11/2018 | |
| WO | WO-2018080043 A1 | * | 5/2018 | G01R 31/364 |

OTHER PUBLICATIONS

English translation of JP2010218900A (Year: 2015).*
English translation of JP 2015220044 A (Year: 2015).*
Extended European Search Report for European Application No. 21748241.3, dated Jul. 11, 2024.
International Search Report for PCT/KR2021/000300 mailed on Apr. 29, 2021.

* cited by examiner

【FIG. 1】
CONVENTIONAL ART
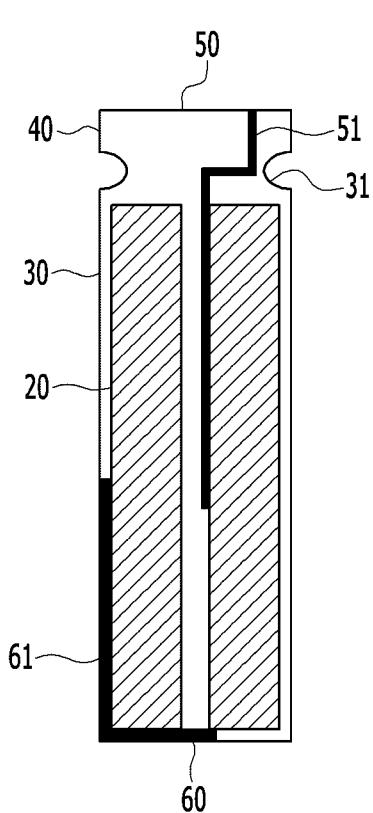

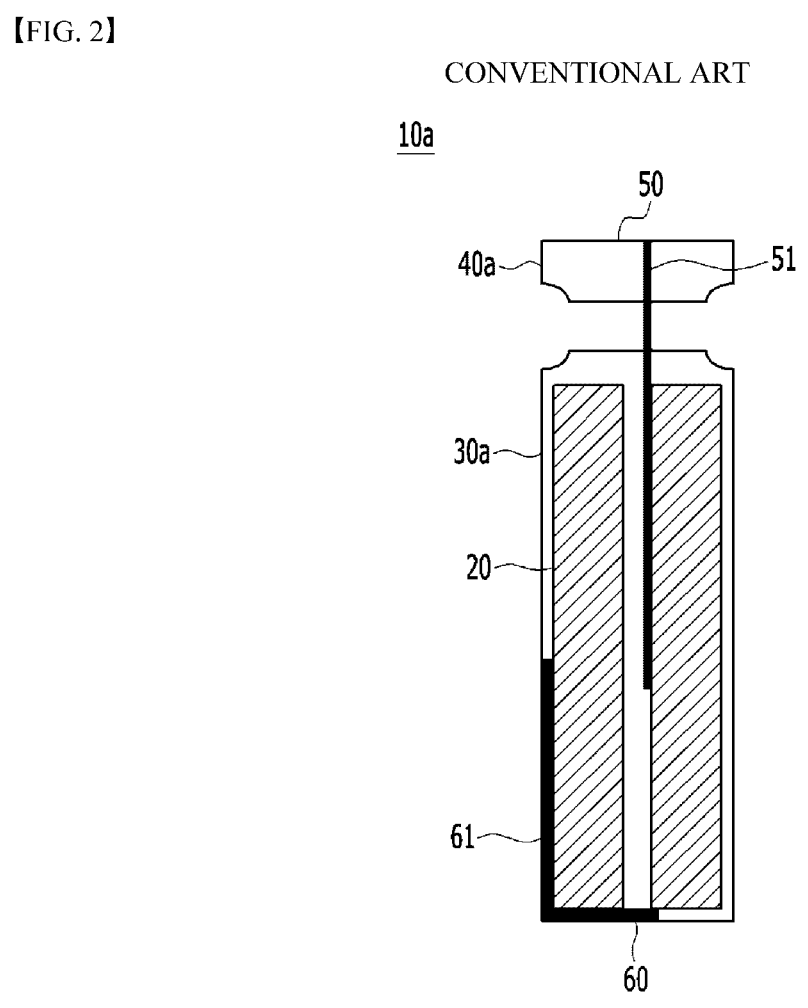

【FIG. 2】

CONVENTIONAL ART

【FIG. 3】
CONVENTIONAL ART
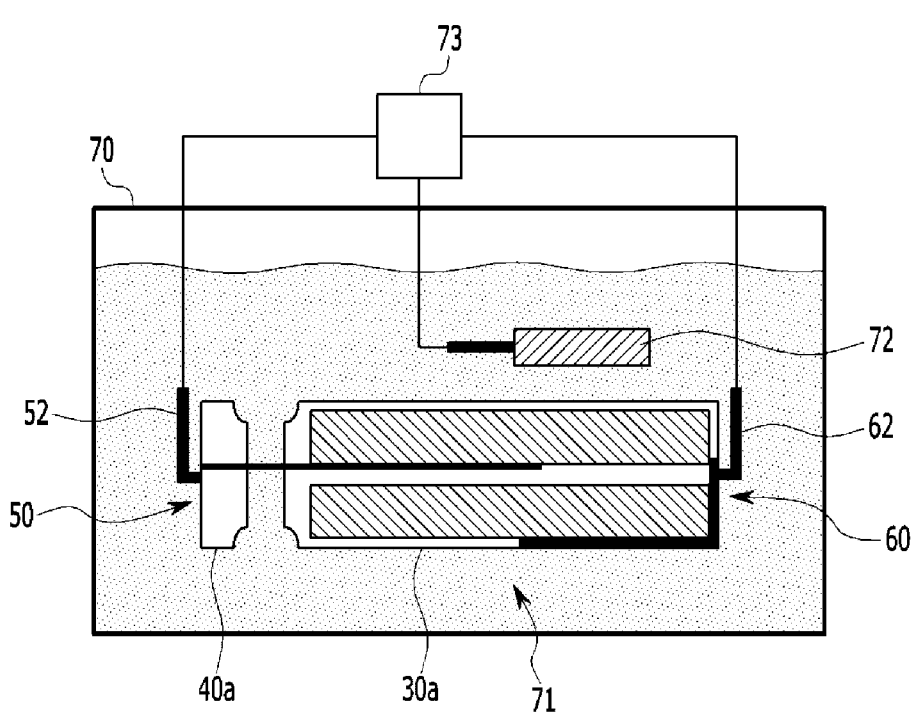

【FIG. 4】
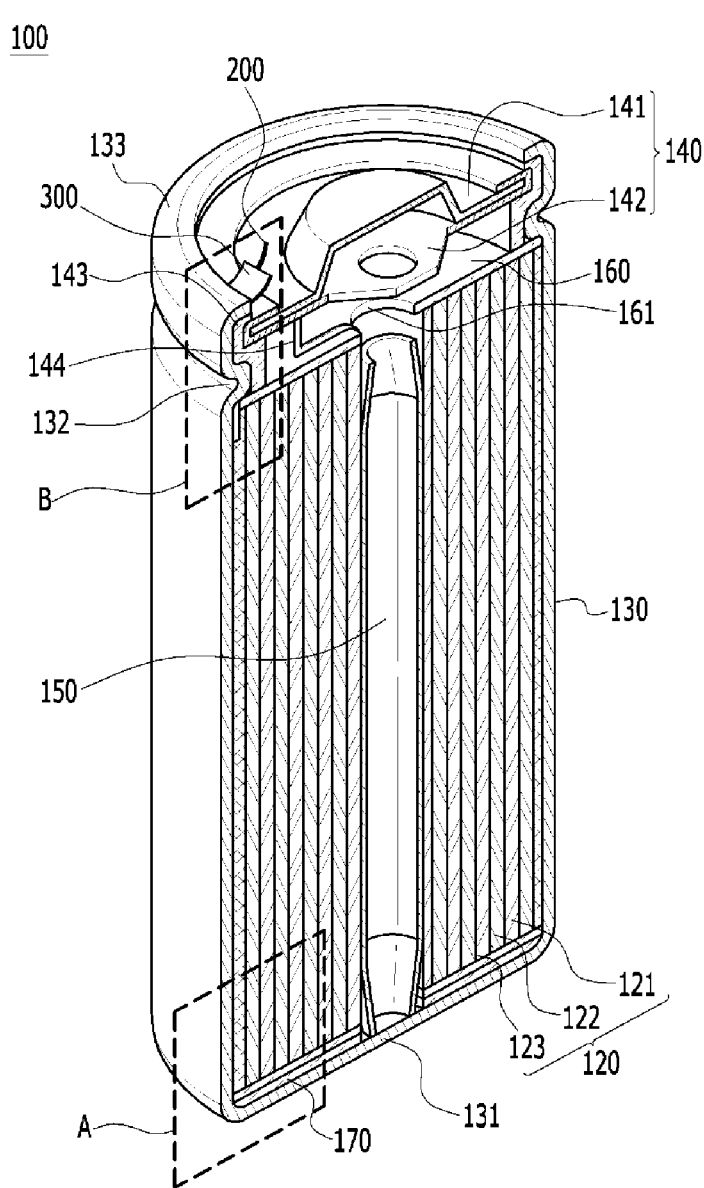

【FIG. 5】
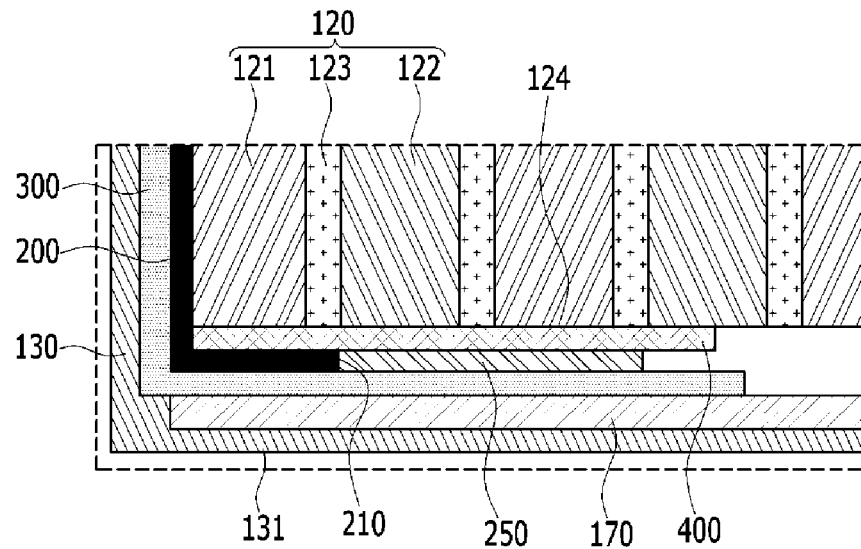
【FIG. 6】
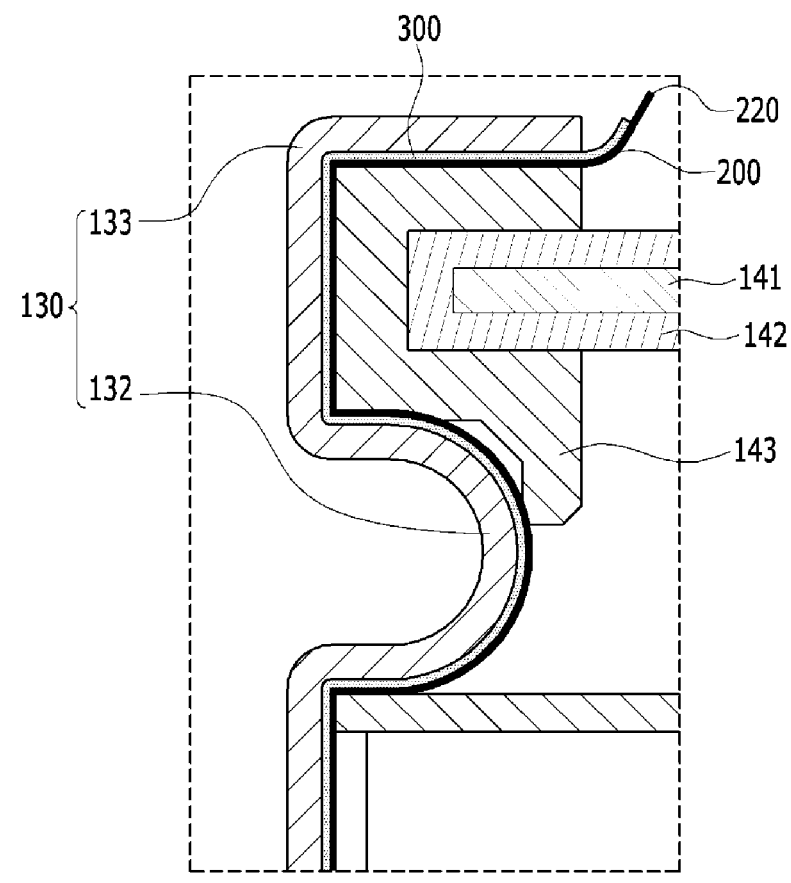

【FIG. 7】
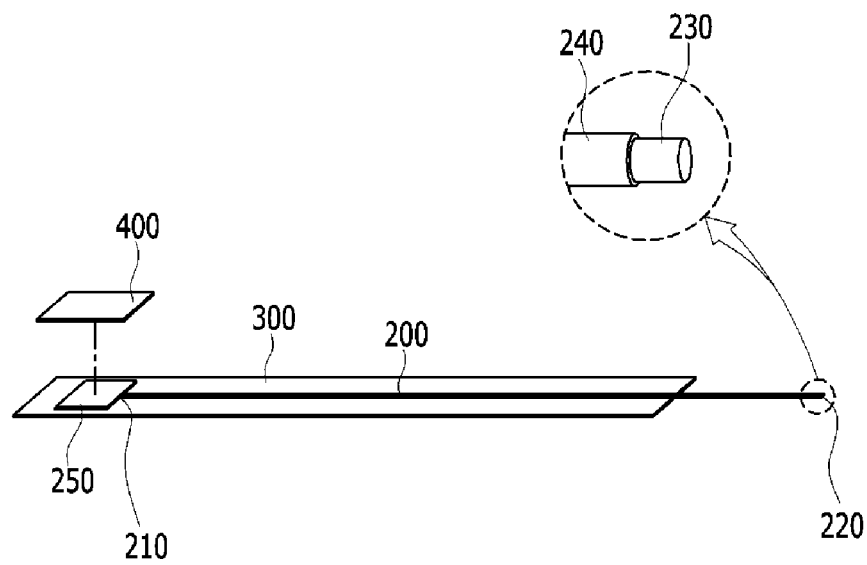
【FIG. 8】
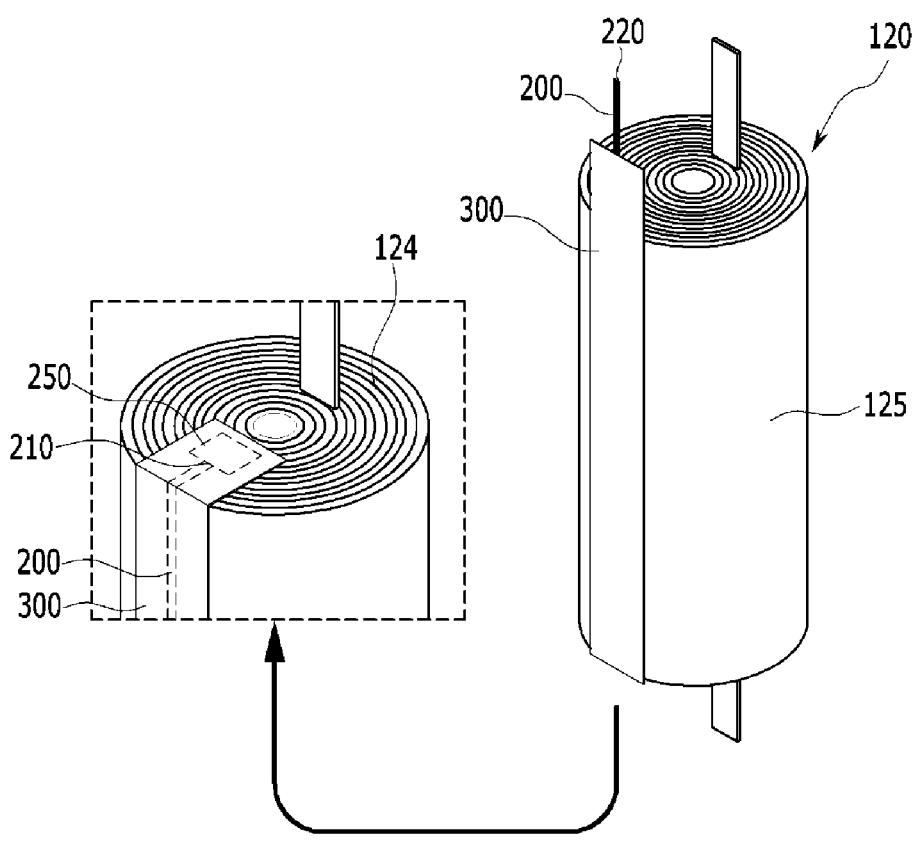

【FIG. 9】
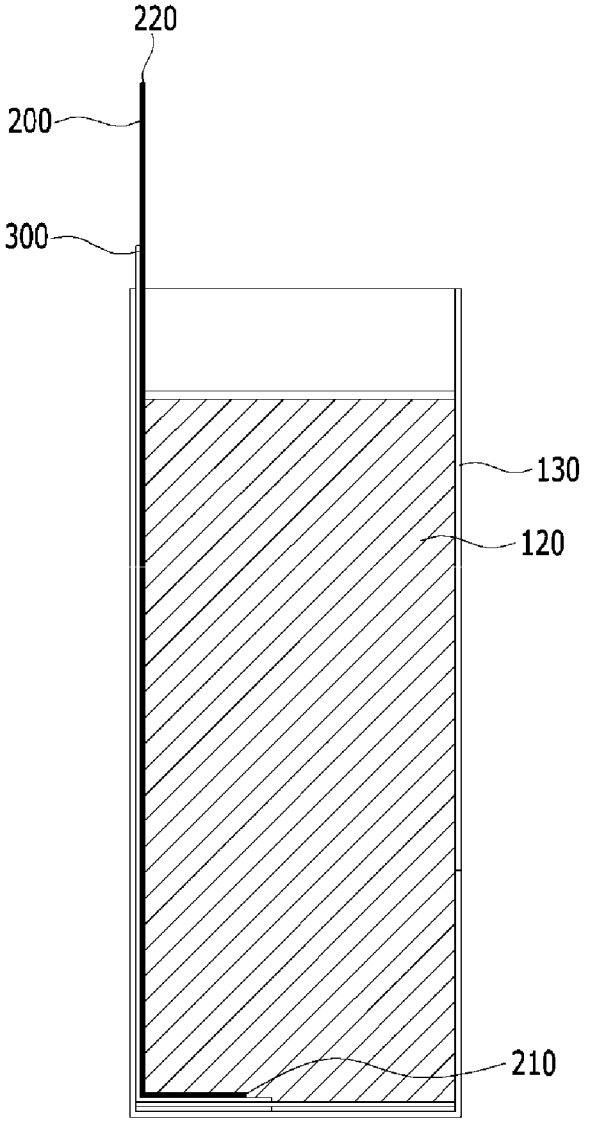

【FIG. 10】
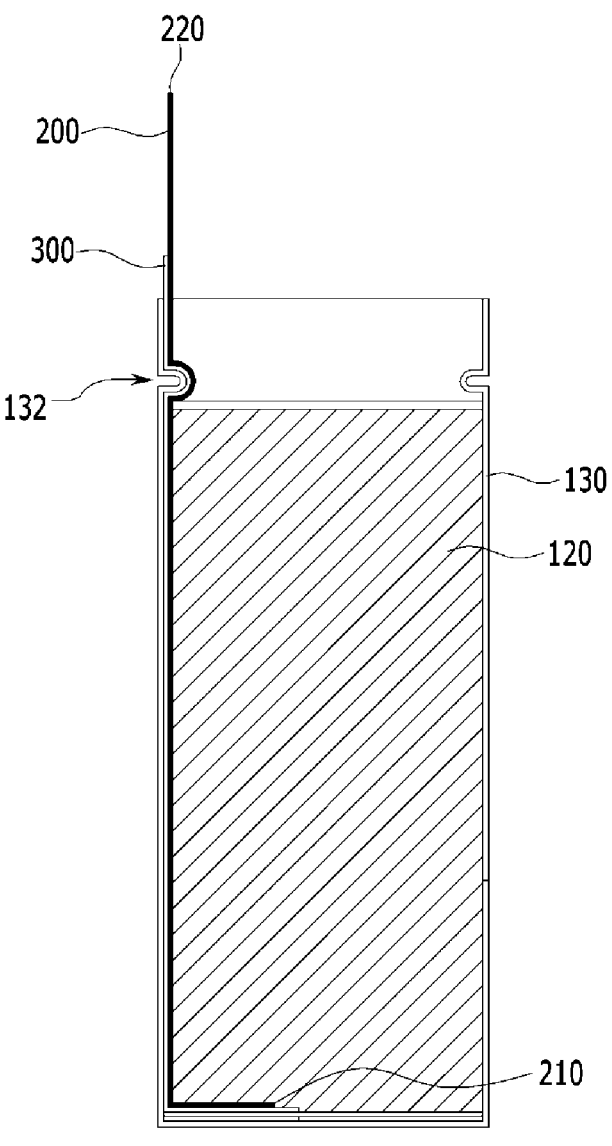

【FIG. 11】
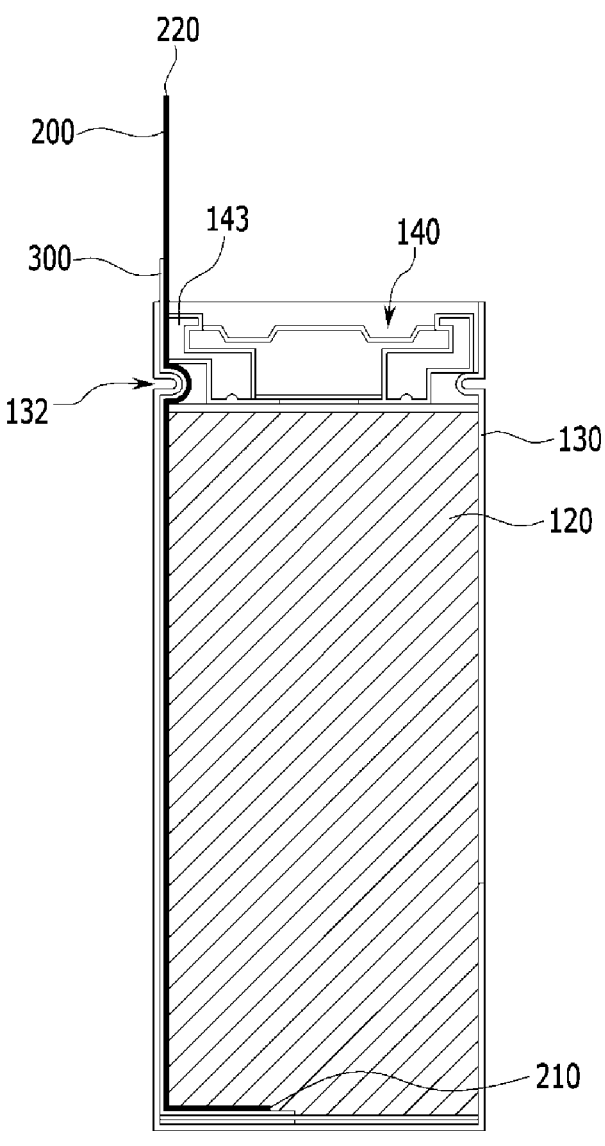

【FIG. 12】
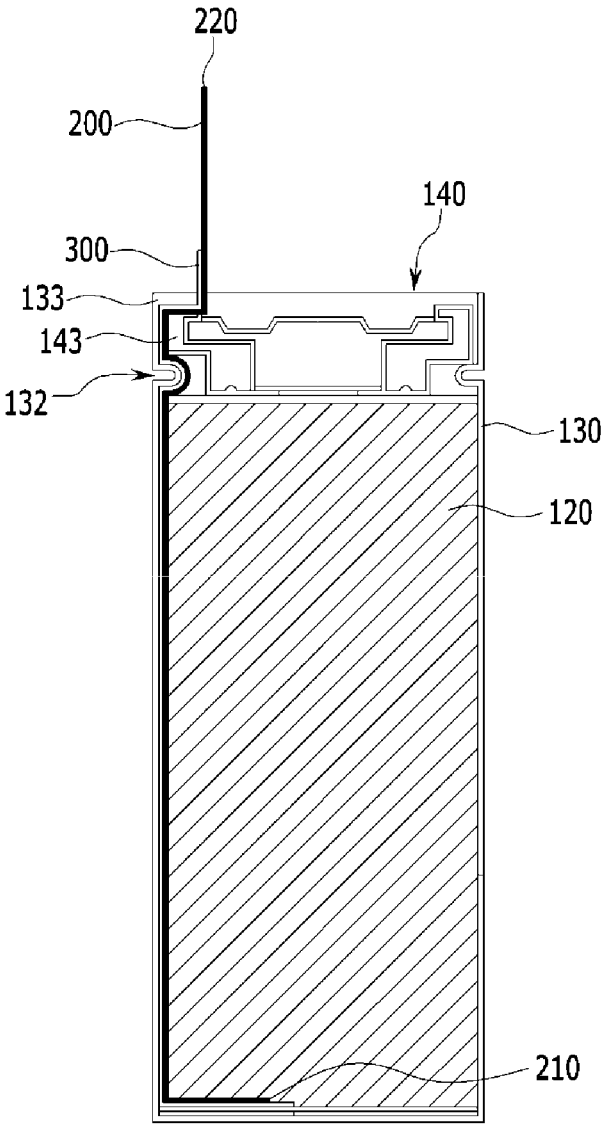

SECONDARY BATTERY AND MANUFACTURING METHOD OF THE SAME

CROSS CITATION WITH RELATED APPLICATION(S)

This application claims the benefit of Korean Patent Application No. 10-2020-0011328 filed on Jan. 30, 2020 with the Korean Intellectual Property Office, the disclosure of which is incorporated herein by reference in its entirety.

TECHNICAL FIELD

The present disclosure relates to a secondary battery and a manufacturing method thereof, and more particularly to a secondary battery including a reference electrode for measuring the electrode potential of a three-electrode system, and a method manufacturing the secondary battery.

BACKGROUND ART

Recently, as energy source price is increasing due to the depletion of fossil fuels and increasing interest is being paid to environmental pollution, the demand for environmentally-friendly alternative energy sources is bound to play an important role in the future life. Thus, research into techniques for generating various kinds of power, such as nuclear energy, solar energy, wind energy, and tidal power, is underway, and power storage apparatuses for more efficient use of the generated energy are also drawing much attention.

In particular, as technology development and demands for mobile devices increase, the demand for batteries as energy sources is rapidly increasing. Accordingly, many researches on batteries capable of meeting diverse demands have been conducted.

Typically, a lithium secondary battery, such as a lithium ion battery or a lithium ion polymer battery, which have advantages such as a high energy density, a discharge voltage, an output stability, and the like is highly demanded.

Further, the secondary batteries may be classified based on how the electrode assembly, having a structure in which a positive electrode, a negative electrode, and a separator interposed between the positive electrode and the negative electrode are stacked, is structured. Typically, the electrode assemblies may include a jelly-roll (wound) type electrode assembly in which long sheet type positive electrodes and negative electrodes are wound in a state where separators are interposed therebetween, and a stacked (laminated) type electrode assembly in which a plurality of positive electrodes and a plurality of negative electrodes, which are cut into predetermined unit sizes, are sequentially stacked in a state where separators are interposed therebetween, and the like. Recently, in order to solve the problems involved in the jelly-roll type electrode assembly and the stacked type electrode assembly, there have been developed a stacked/folded type electrode assembly which is a combination of the jelly-roll type electrode assembly and the stacked type electrode assembly, and has a structure in which unit cells stacked with certain units of the positive electrodes and unit negative electrode are sequentially wound with a separation film while a separator being interposed therebetween.

Further, the secondary battery is classified based on the shape of a battery case into a cylindrical battery having an electrode assembly mounted in a cylindrical container, a prismatic battery having an electrode assembly mounted in a prismatic container, or a pouch-shaped case having an electrode assembly mounted in a pouch-shaped case formed of an aluminum laminate sheet.

FIG. 1 is schematically a schematic diagram schematically illustrating a structure of a cylindrical secondary battery 10.

Referring to FIG. 1, the cylindrical secondary battery 10 is manufactured by mounting a wound type electrode assembly 20 in a cylindrical case 30, injecting an electrolyte solution into the case 30, and coupling a cap assembly 40 provided with an electrode terminal to the open upper end of the case 30.

Further, in the case 30, a beading part 31 indented in a central direction may be formed in order to stably couple the cap assembly 40 and prevent movement of the electrode assembly 20.

When the electrode assembly 20 is mounted in the case 30, a first electrode tab 51 and a second electrode tab 61 are protruded in directions that are opposite to each other. Moreover, the first electrode tab 51 is connected to the cap assembly 40 coupled to one opened surface of the case 30 in a state of being protruded toward the opened one surface, and accordingly, one surface of the cap assembly 40 acts as the first electrode 50.

The second electrode tab 61 is protruded in a direction of a lower surface of the case 30, which is opposite to the opened one surface of the case 30, and coupled to an inner surface of the case 30, and accordingly, the lower surface of the case 30 acts as a second electrode 60.

The first electrode 50 and the second electrode 60 may be a positive electrode and a negative electrode, respectively.

In order to check the performance of newly developed and manufactured battery cells, a process of measuring an electrode potential of a battery cell is undertaken.

For measurement of an electrode potential, a method for measuring an electrode potential of a three-electrode system composed of a reference electrode, a working electrode, and a counter electrode is mainly used.

The reference electrode is an electrode used to create a battery circuit for the measurement of an electrode potential in order to measure the potential of the electrode constituting a battery or the electrode causing an electrolysis, and acts as a reference for potentials when measuring the relative value of electrode potential.

FIG. 2 is a schematic diagram illustrating a state after a beading part of the cylindrical secondary battery of FIG. 1 is cut for measurement of an electrode potential.

Referring to FIG. 2, the beading part 31 of the secondary battery 10 of FIG. 1 is cut to measure an electrode potential. The separated cylindrical secondary battery 10a is configured of a cap assembly 40a having an opened lower portion, and a case 30a having an opened upper portion, and the first electrode tab 51 is maintained while being not cut. That is, the sealing of the cylindrical secondary battery 10a is released through the cutting of the beading part 31.

FIG. 3 is schematically a schematic diagram illustrating a conventional method for measuring an electrode potential.

Referring to FIG. 3 together with FIG. 2, the separated, i.e., unsealed cylindrical secondary battery 10a is sealed in a tray 70 while being immersed in an electrolyte solution 71, and a working electrode terminal 52 and a counter electrode terminal 62 for measuring electrode potentials, are respectively connected to the first electrode 50 and the second electrode 60 of the separated cylindrical secondary battery 10a.

The working electrode terminal 52 and the counter electrode terminal 62 are connected to a measurement unit 73 together with the reference electrode terminal 72 to measure the electrode potential of the cylindrical secondary battery 10a.

However, in the conventional method for measuring an electrode potential, even though the cylindrical secondary battery 10a is identical, the data values may vary depending on a procedure or method of measurement by an operator. In particular, in the conventional method, it is difficult to precisely adjust the injected amount of the electrolyte solution, and when the electrolyte solution is excessively injected, a large deviation may occur in the measured data values.

Further, the conventional method is a form in which a cylindrical secondary battery is immersed in an electrolyte solution, and thus, there is a problem that an amount of electrolyte solution may be excessively used more than necessary.

Since the conventional method for measuring an electrode potential of a three-electrode system has many problems as described above, there is a great need to develop a technology for solving the above-mentioned problems.

DETAILED DESCRIPTION OF THE INVENTION

Technical Problem

Embodiments of the present disclosure have been designed to solve the above-mentioned problems of the previously proposed methods, and an object of the present disclosure is to provide a secondary battery that can accurately measure the actual electrode potential without introducing a separate tray, and a method of manufacturing such a secondary battery.

However, the problem to be solved by embodiments of the present disclosure is not limited to the above-described problems, and can be variously expanded within the scope of the technical idea included in the present disclosure.

Technical Solution

A secondary battery according to an embodiment of the present disclosure includes: a jelly roll-type electrode assembly impregnated with an electrolyte solution; a battery case housing the electrode assembly and the electrolyte solution; a cap assembly coupled with an upper portion of the battery case; and a reference electrode having a first end immersed with the electrolyte solution and a second end exposed outside the battery case by extending between the battery case and the cap assembly.

The secondary battery further includes a gasket located between the battery case and the cap assembly to maintain an airtight seal, wherein the reference electrode may be located between the battery case and the gasket.

The battery case and the cap assembly are crimp-coupled with the gasket and the reference electrode being interposed therebetween.

The reference electrode may extend from a lower portion of the electrode assembly along an outer peripheral surface of the electrode assembly and pass between the battery case and the cap assembly.

The first end of the reference electrode may be located at a lower portion of the electrode assembly.

The secondary battery may further include a separating member that is located between the electrode assembly and the first end of the reference electrode.

The secondary battery may further include an insulating tape that is located between the reference electrode and the battery case.

The insulating tape may include at least one of polyimide (PI), polyethylene terephthalate (PET), or polypropylene (PP).

The insulating tape may be extended to cover the one end of the reference electrode.

The reference electrode may include a metal wire, and a coating layer surrounding a metal wire.

The coating layer may include an enamel layer.

The reference electrode may include a metal plate that is attached to the first end of the reference electrode.

A method for manufacturing a secondary battery according to one embodiment of the present disclosure may include: an attachment step in which a reference electrode is attached to a jelly roll-type electrode assembly; a housing step in which the electrode assembly to which the reference electrode is attached is housed in a battery case; a coupling step in which a cap assembly is coupled with an upper portion of the battery case; and a crimping step in which the battery case and the cap assembly are crimp-coupled with the reference electrode being interposed therebetween.

The attachment step may include attaching the reference electrode to the electrode assembly using an electrical insulating tape.

The coupling step may include coupling a gasket to an upper portion of the battery case together with the cap assembly, and the crimping step may include crimp-coupling the battery case and the cap assembly with the reference electrode and the gasket being interposed therebetween.

Advantageous Effects

According to the embodiments of the present disclosure, a secondary battery capable of accurately measuring the actual electrode potential by providing a reference electrode that passes between the battery case and the cap assembly can be provided.

Further, by utilizing an actual secondary battery without introducing a separate tray, it is possible to obtain an electrode potential value excluding a resistance intervened by an additional lead wire or an excessive electrolyte solution.

Further, by configuring the reference electrode to pass between the battery case and the cap assembly, rather than forming another hole to expose it to the outside, the electrode potential can be measured while maintaining the sealing without damaging the structure of the secondary battery. In addition, there is an advantage in that it is possible to perform a high-temperature evaluation in which an internal pressure is largely generated.

BRIEF DESCRIPTION OF THE DRAWINGS

FIG. 1 is a schematic diagram schematically showing the structure of a cylindrical secondary battery.

FIG. 2 is a schematic diagram showing a beading portion of the cylindrical secondary battery of FIG. 1 for measuring an electrode potential.

FIG. 3 is a schematic diagram schematically showing a conventional method for measuring an electrode potential.

FIG. 4 is a cross-sectional perspective view of a secondary battery according to an embodiment of the present disclosure.

FIG. 5 is an enlarged cross-sectional view of part "A" of FIG. 4.

FIG. 6 is an enlarged cross-sectional view of part "B" of FIG. 4.

FIG. 7 is a perspective view illustrating a reference electrode, an insulating tape, and a separating member included in the secondary battery of FIG. 4.

FIG. 8 is a perspective view showing a state in which the reference electrode, the insulating tape, and the separating member in FIG. 7 are attached to the electrode assembly.

FIGS. 9 to 12 are views for explaining a process of manufacturing a secondary battery according to an embodiment of the present disclosure.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments set forth herein.

Portions that are irrelevant to the description will be omitted to clearly describe the present disclosure, and like reference numerals designate like elements throughout the specification.

Further, in the figures, the size and thickness of each element are arbitrarily illustrated for convenience of description, and the present disclosure is not necessarily limited to those illustrated in the drawings. In the figures, the thickness of layers, regions, etc. are exaggerated for clarity. In the drawings, for convenience of description, the thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the specification, when a portion is referred to as "including" a certain component, it means that it can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

FIG. 4 is a cross-sectional perspective view of a secondary battery according to an embodiment of the present disclosure, FIG. 5 is an enlarged cross-sectional view of part "A" of FIG. 4, and FIG. 6 is an enlarged cross-sectional view of part "B" of FIG. 4.

Referring to FIGS. 4 to 6, the secondary battery 100 according to an embodiment of the present disclosure includes a jelly roll-type electrode assembly 120 impregnated with an electrolyte solution, a battery case 130 for housing the electrode assembly 120 and the electrolyte solution, a cap assembly 140 coupled with an upper portion of the battery case 130, and a reference electrode 200. In the reference electrode 200, one end 210 is immersed in the electrolyte solution and the other end 220 is exposed to the outside through between the battery case 130 and the cap assembly 140.

The electrode assembly 120 has a jelly roll-type structure in which plural positive electrodes 121 and negative electrodes 122 are wound while a separator 123 being interposed therebetween, and a center pin 150 may be inserted in the central part thereof. A top insulator 160 may be located on the upper portion of the electrode assembly 120, and a bottom insulator 170 may be located between the lower portion 124 of the electrode assembly 120 and the bottom portion 131 of the battery case 130.

The electrolyte solution may be a lithium salt-containing non-aqueous electrolyte solution, and the lithium salt-containing non-aqueous electrolyte solution is composed of a non-aqueous electrolyte solution and a lithium salt. As the non-aqueous electrolyte solution, a non-aqueous organic solvent, an organic solid electrolyte, an inorganic solid electrolyte, or the like is used, but is not limited thereto. This electrolyte solution is housed in the battery case 130 together with the electrode assembly 120, and specific indications on the figures are omitted.

The battery case 130 may include a beading portion 132 and a crimping portion 133.

The beading portion 132 refers to a portion in which a portion of the battery case 130 is indented toward a center direction of the electrode assembly 120, and is for stably coupling the cap assembly 140 and preventing the electrode assembly 120 from shaking.

The crimping portion 133 refers to a portion located above the beading portion 132 and surrounding the cap assembly 140, and is for stably coupling the cap assembly 140. That is, the battery case 130 is crimp-coupled with the cap assembly 140 to form a crimping portion 133.

The cap assembly 140 may include an upper cap 141 forming a positive electrode terminal, and a cap plate 142 to which the positive electrode tab 144 extending upward from the electrode assembly 120 is connected. The positive electrode tab 144 may be extended from the positive electrode 121 of the electrode assembly 120.

Meanwhile, the secondary battery 100 according to the present embodiment may include a gasket 143 located between the battery case 130 and the cap assembly 140. Specifically, the gasket may be located between the crimping portion 133 of the battery case 130 and the cap plate 142 of the cap assembly 140.

The gasket 143 is attached to the upper inner surface of the beading portion 132 and the crimping portion 133 to maintain airtightness, thereby increasing the sealing force between the cap assembly 140 and the battery case 130.

In this case, the reference electrode 200 may be located between the battery case 130 and the gasket 143. In addition, the battery case 130 and the cap assembly 140 may be crimp-coupled together with the gasket 143 and the reference electrode 200 being interposed therebetween. Therefore, the reference electrode 200 can be provided in the secondary battery 100 in an actual operating state, and the reference electrode 200 may be stably fixed between the battery case 130 and the gasket 143.

The secondary battery 100 according to the present embodiment can measure the electrode potential of a three-electrode system, while maintaining in the actual operating state through the reference electrode 200 exposed to the outside through between the battery case 130 and the cap assembly 140, unlike the conventional method of measuring the electrode potential using a tray 70 (see FIG. 3). Actually, it is possible to accurately measure the electrode potential.

In addition, in the conventional electrode potential measurement method, in which it is difficult to precisely adjust the injected amount of the electrolyte solution, and in the case of excessive injection of the electrolyte solution, a large deviation may occur in the data value. Unlike this, the present embodiment measures the electrode potential for the secondary battery 100 in an actual operating state without releasing the sealing, and thus, consistent data can be obtained.

Further, by utilizing the secondary battery 100 in an actual operating state without introducing a separate tray, it is possible to obtain an accurate electrode potential value excluding the resistance intervened by additional wires or excess electrolyte solution.

Further, since it is not necessary to inject an excessive amount of electrolyte solution, waste of raw materials can be prevented and the possibility of corrosion of parts can be reduced.

On the other hand, the secondary battery 100 according to the present embodiment does not expose the reference electrode 200 by providing a separate hole, but allows the reference electrode 200 to locate between the crimping portion 133 of the battery case 130 and the cap plate 142 of the cap assembly 140, and therefore, it is possible to measure the electrode potential while maintaining the sealing without damaging the structure of the secondary battery 100.

If a separate hole is provided, a separate sealant must be interposed for sealing between the reference electrode and the hole. In such a case, there is a disadvantage that an additional space is required inside the secondary battery for interposing the sealant, and there is a problem that the sealing is easily released by deformation of the sealant.

Unlike this, the reference electrode 200 of the secondary battery 100 according to the present embodiment is provided between the crimping portion 133 and the gasket 143, does not require the formation of a separate hole, and can be tightly fixed and sealed due to crimp-coupling. That is, even if the reference electrode 200 is provided, problems such as unsealing or structural deformation of the secondary battery 100 do not occur. Accordingly, the secondary battery 100 according to the present embodiment has an advantage that it can evaluate a high temperature at which an internal pressure is largely generated.

The battery case 130 may be a cylindrical case or a prismatic case, but as shown in FIG. 4, the battery case 130 is preferably a cylindrical case.

Meanwhile, the reference electrode 200 extends from the lower portion 124 of the electrode assembly 120 along the outer peripheral surface 125 (see FIG. 8) of the electrode assembly 120, and can pass between the battery case 130 and the cap assembly 140, and one end 210 of the reference electrode 200 may be located on the lower portion 124 of the electrode assembly 120 as shown in FIG. 5. In other words, one end 210 of the reference electrode 200 may be located between the lower portion 124 of the electrode assembly 120 and the bottom insulator 170 while being immersed with the electrolyte solution.

Further, the reference electrode 200 may include a metal plate 250 attached to one end 210 of the reference electrode 200. The metal plate 250 will be described hereinafter.

As one end 210 of the reference electrode 200 extends up to the lower portion 124 of the electrode assembly 120, the reference electrode 200 can be stably immersed with the electrolyte solution, and the electrode potential of the three-electrode system can be measured more accurately and consistently.

In addition, if one end 210 of the reference electrode 200 is located on the outer peripheral surface 125 of the electrode assembly 120, it may interfere for housing the electrode assembly 120 in the battery case 130, but in the present embodiment, since one end 210 of the reference electrode 200 extends up to the lower portion 124 of the electrode assembly 120, such a problem does not occur.

In addition, since one end 210 of the reference electrode 200 is located at the lower portion 124 of the electrode assembly 120, there is an advantage that due to the weight of the electrode assembly 120, the deviation in the spacing between the metal plate 250 located at one end 210 of the reference electrode 200, and the positive and negative electrodes 121 and 122 of the electrode assembly 120 is reduced.

At this time, the secondary battery 100 according to an embodiment of the present disclosure may further include a separating member 400 located between the electrode assembly 120 and one end 210 of the reference electrode 200, and the separating member 400 may be in the form of a thin film. Further, the separating member 400 may be located between the electrode assembly 120 and the metal plate 250 attached to the one end 210 of the reference electrode 200.

Although not specifically shown, the jelly roll-type electrode assembly 120 in which the positive electrode 121, the negative electrode 122, and the separator 123 are wound may be configured to surround the outer peripheral surface 125 (see FIG. 8) with an outer peripheral sheet. Therefore, it is possible to avoid the problem that the reference electrode 200 connected along the outer peripheral surface 125 of the electrode assembly 120 comes into contact with the outer peripheral surface 125 of the electrode assembly 120 to cause a short circuit. However, if the reference electrode 200 extended up to the lower portion 124 of the electrode assembly 120 comes into contact with the lower portion 124 of the electrode assembly 120, a short circuit may occur. Such a short circuit may induce an overcurrent of the secondary battery 100 to ignite or explode.

Therefore, the separating member 400 is located between the electrode assembly 120 and the one end 210 of the reference electrode 200, thereby being able to prevent a short circuit between the lower portion 124 of the electrode assembly 120 and the reference electrode 200. In order to effectively prevent short circuits, the separating member 400 preferably covers both the reference electrode 200 and the metal plate 250 attached to the one end 210 of the reference electrode 200, and may include a porous non-woven fabric material or a material applied to the separator 123. The material applied to the separation membrane 123 is not particularly limited, and materials such as polypropylene, fiberglass or polyethylene may be used.

FIG. 7 is a perspective view showing the reference electrode 200, the insulating tape 300 and the separating member 400 included in the secondary battery 100 of FIG. 4, and FIG. 8 is a perspective view showing a state in which the reference electrode 200, the insulating tape 300 and the separating member 400 in FIG. 7 are attached to the electrode assembly 120.

Referring to FIGS. 7 and 8 together with FIGS. 4 to 6, the secondary battery 100 according to the present embodiment may further include an insulating tape 300 located between the reference electrode 200 and the battery case 130. The insulating tape 300 is an electrical insulating tape, and may include at least one of polyimide (PI), polyethylene terephthalate (PET), and polypropylene (PP).

Specifically, the insulating tape 300 can be extended together along the direction in which the reference electrode 200 connects, except for the other end 220 of the reference electrode 200 exposed to the outside, thereby covering the reference electrode 200. Therefore, the insulating tape 300 prevents the battery case 130 including the bottom portion 131, the beading portion 132, and the crimping portion 133 from contacting the reference electrode 200, thereby blocking in advance the risk of a short circuit that may arise from the reference electrode 200.

For effective short circuit prevention, it is preferable that the insulating tape 300 covers all portions of the reference electrode 200 except for the other end 220 of the reference electrode 200 as shown in FIGS. 7 and 8. In particular, the insulating tape 300 can be extended to cover up to the one end 210 of the reference electrode 200.

Meanwhile, since the reference electrode 200 can be attached to the outer peripheral surface 125 and the lower portion 124 of the electrode assembly 120 using the insulating tape 300, the insulating tape 300 not only has an effect of preventing a short circuit, but also serves to fix the reference electrode 200 in the secondary battery 100. In addition, since the insulating tape 300 can cover up to the one end 210 of the reference electrode 200, the metal plate 250 and the separating member 400 including the one end 210 of the reference electrode 200 may be attached and fixed to the lower portion 124 of the electrode assembly 120.

Further, since the reference electrode 200 can be assembled together in the state of being attached to the electrode assembly 120, the secondary battery 100 provided with the reference electrode 200 can be easily manufactured without any separate additional process. This part will be described hereinafter in detail in FIGS. 9 to 12.

Meanwhile, the reference electrode 200 may include a metal wire 230 and a coating layer 240 surrounding a metal wire 230. If the metal wire 230 contains a metal having electrical conductivity, the material thereof is not limited, and it can contain copper (Cu). The coating layer 240 may include an enamel layer. Through the coating layer 240, it is possible to prevent the metal wire 230 from coming into contact with other parts of the secondary battery (100) and so occurring an unintended short circuit.

As described above, the secondary battery 100 according to the embodiment of the present disclosure is provided with an insulating tape 300 and a coating layer 240, thereby attempting to prevent an unintended short circuit from occurring in the secondary battery. According to each embodiment, only one of the insulating tapes 300 or the coating layers 240 may be provided, but it is preferable to provide both the insulating tape 300 and the coating layer 240.

Meanwhile, as shown in FIG. 7, the other end 220 of the reference electrode 200 may peel off a partial area of the coating layer 240 to expose the metal wire 230.

Similarly, the one end 210 of the reference electrode 200 may be exposed to the metal wire 230 by peeling off a partial area of the coating layer 240, and the metal plate 250 may be attached to the exposed metal wire 230. Thereafter, the separating member 400 may be located on the metal plate 250.

The metal plate 250 immersed in the electrolyte solution functions as a reference electrode terminal, and the metal wire 230 exposed at the other end 220 of the reference electrode 200 is connected to an external wire, so that a three-electrode electrode potential is measured. Although not specifically shown, when the three-electrode electrode potential is not measured, the exposed metal wire 230 may be stored while being wrapped with another insulating tape. The metal plate 250 may include at least one of lithium (Li), lithium titanate (LTO), lithium iron phosphate (LFP), platinum (Pt), and palladium (Pd).

The insulating tape 300 may attach and fix the metal plate 250 and the separating member 400 to the lower portion 124 of the electrode assembly 120 as described above. Further, as shown in FIG. 7, the reference electrode 200, the metal plate 250, and the separating member 400 can be located on the insulating tape 300, and thus, the connection and fixation between the reference electrode 200, the metal plate 250, and the separating member 400 can also be made by the insulating tape 300.

Meanwhile, referring again to FIG. 4, the top and bottom insulators 160 and 170 may include insulating fibers, and such insulating fiber can be entangled without orientation to form a non-woven fabric-like shape. The insulating fiber may include at least one of polyethylene, polybutylene, polystyrene, polyethylene terephthalate, polypropylene, glass fiber, natural rubber, and synthetic rubber.

The center pin 150 generally includes a metal material to impart a predetermined strength, and is composed of a cylindrical structure in which a plate material is bent into a round shape. This center pin 150 fixes and supports the electrode assembly 120, and can function as a passage for releasing gas generated by an internal reaction during charging/discharging and operation.

Hereinafter, a method of manufacturing a secondary battery according to an embodiment of the present disclosure will be described with reference to FIGS. 8 to 12. However, descriptions of the part that overlap with the contents described above will be omitted.

FIGS. 9 to 12 are diagrams for explaining a method of manufacturing a secondary battery according to an embodiment of the present disclosure. Referring to FIGS. 8 to 12, the method for manufacturing a secondary battery according to an embodiment of the present disclosure includes an attachment step in which a reference electrode 200 is attached to a jelly roll-type electrode assembly 120, a housing step in which the electrode assembly 120 to which the reference electrode 200 is attached is housed in a battery case 130, a coupling step in which a cap assembly 140 is coupled with an upper portion of the battery case 130; and a crimping step in which the battery case 130 and the cap assembly 140 are crimp-coupled with the reference electrode 200 being interposed therebetween.

First, the attachment step will be described together with FIG. 8. In the attachment step, the reference electrode 200 can be attached to the electrode assembly 120 using an electrical insulating tape 300. Specifically, it can be attached to the lower portion 124 and the outer peripheral surface 125 of the electrode assembly 120. As described above, the separating member can be located between the lower portion 124 of the electrode assembly 120 and one end 210 of the reference electrode 200.

Next, the housing step will be described together with FIG. 9. In the housing step, the electrode assembly 120 can be housed in the battery case 130 in a state where the reference electrode 200 is attached. The battery case 130 is in a state where the upper portion is opened, and the electrode assembly 120 may be housed through such an upper portion. At this time, one end 210 of the reference electrode 200 may be attached in a state of being extended up to the lower portion 124 of the electrode assembly 120, and through such a structure, the metal plate 250 of the reference electrode 200 may not be interfered during housing.

Thereafter, as shown in FIG. 10, a beading portion 132 may be formed by indenting a region of the battery case 130 above the electrode assembly 120 toward the center direction of the electrode assembly 120. Although not specifically shown, welding of the electrode tab and insertion of the upper insulating member may be performed before the formation of the beading portion 132. On the other hand, in order to prevent the metal wire of the reference electrode 200 from being disconnected, the other end 220 of the reference electrode 200 can be adjusted to be located inside the battery case 130, and only the other end 220 of the reference electrode 200 may be wrapped with a separate insulating tape.

Next, the coupling step will be described with reference to FIG. 11. In the coupling step, the cap assembly 140 is coupled to the open upper portion of the battery case 130. Further, the gasket 143 may be coupled to the battery case 130 together with the cap assembly 140. The reference electrode 200 may be located between the battery case 130 and the gasket 143, and the insulating tape 300 may be located between the battery case 130 and the reference electrode 200.

Finally, the crimping step will be described with reference to FIG. 12. In the crimping step, the battery case 130 and the cap assembly 140 may be crimp-coupled with the gasket 143 and the reference electrode 200 being interposed therebetween, thereby forming crimping portion 133.

The reference electrode 200 according to the present embodiment passes between the battery case 130 and the cap assembly 140, particularly between the clamping portion 133 and the gasket 143, even without forming a separate hole, and can be extended to the outside. The reference electrode 200 for measuring the electrode potential of the three-electrode system can be conveniently provided along with the step of housing the electrode assembly 120 in the battery case 130, without a separate additional step.

Further, since it is tightly sealed by the clamping portion 133 and the gasket 143, high-temperature evaluation in which an internal pressure occurs can proceed without difficulty.

The terms representing directions such as the front side, the rear side, the left side, the right side, the upper side, and the lower side have been used in the present embodiment, but the terms used are provided simply for convenience of description and may become different according to the location of an object or an observer.

One or more secondary batteries according to the present embodiment described above can be applied to various devices. For example, the secondary battery can be applied to transportation means such as an electric bike, an electric vehicle, and a hybrid electric vehicle, and may be applied to various devices capable of using a secondary battery, without being limited thereto.

The present disclosure has been described in detail with reference to exemplary embodiments thereof, but the scope of the present disclosure is not limited thereto and modifications and improvements made by those skilled in the part by using the basic concept of the present disclosure, which are defined in the following claims, also belong to the scope of the present disclosure.

DESCRIPTION OF REFERENCE NUMERALS

100: secondary battery
120: electrode assembly
130: battery case
132: beading portion
133: crimping unit
140: cap assembly
143: gasket
150: center pin
160: top insulator
170: bottom insulator
200: reference electrode
230: metal wire
240: coating layer
300: insulating tape
400: separating member

The invention claimed is:

1. A secondary battery comprising:
a jelly roll-type electrode assembly impregnated with an electrolyte solution;
a battery case housing the electrode assembly and the electrolyte solution;
a cap assembly coupled with an upper portion of the battery case; and
a reference electrode having a first end immersed with the electrolyte solution and a second end exposed outside the battery case by extending between the battery case and the cap assembly, the reference electrode extending below a lowermost end of the electrode assembly such that the first end of the reference electrode is located below the lowermost end of the electrode assembly, the first end being bent to extend along the lowermost end of the electrode assembly.

2. The secondary battery according to claim 1,
further comprising a gasket located between the battery case and the cap assembly to provide an airtight seal,
wherein the reference electrode is located between the battery case and the gasket.

3. The secondary battery according to claim 2,
wherein the battery case and the cap assembly are crimp-coupled with the gasket and the reference electrode being interposed therebetween.

4. The secondary battery according to claim 1,
wherein the reference electrode extends from the lowermost end of the electrode assembly along an outer peripheral surface of the electrode assembly and passes between the battery case and the cap assembly.

5. The secondary battery according to claim 1, further comprising a separating member that is located between the electrode assembly and the first end of the reference electrode,
wherein the electrode assembly includes a plurality of positive electrodes, a plurality of negative electrodes, and a separator interposed therebetween.

6. The secondary battery according to claim 1, further comprising an insulating tape that is located between the reference electrode and the battery case.

7. The secondary battery according to claim 6,
wherein the insulating tape includes at least one of polyimide (PI), polyethylene terephthalate (PET), or polypropylene (PP).

8. The secondary battery according to claim 6,
wherein the insulating tape is extended to cover the first end of the reference electrode.

9. The secondary battery according to claim 1,
wherein the reference electrode includes a metal wire, and a coating layer surrounding the metal wire.

10. The secondary battery according to claim 9,
wherein the coating layer includes an enamel layer.

11. The secondary battery according to claim 1,
wherein the reference electrode includes a metal plate that is attached to the first end of the reference electrode.

* * * * *